United States Patent
Hohmann et al.

(10) Patent No.: US 7,062,998 B2
(45) Date of Patent: Jun. 20, 2006

(54) HYDRAULIC THREADED BOLT TIGHTENING DEVICE AND METHOD OF USE THEREOF

(76) Inventors: Jörg Hohmann, Uhlandstr. 6a, 59872 Meschede (DE); Frank Hohmann, Beethoverstr. 9, 59581 Warstein (DE)

( * ) Notice: Subject to any disclaimer, the term of this patent is extended or adjusted under 35 U.S.C. 154(b) by 76 days.

(21) Appl. No.: 10/489,896

(22) PCT Filed: Sep. 11, 2002

(86) PCT No.: PCT/EP02/10180

§ 371 (c)(1),
(2), (4) Date: May 10, 2004

(87) PCT Pub. No.: WO03/024670

PCT Pub. Date: Mar. 27, 2003

(65) Prior Publication Data

US 2004/0261583 A1    Dec. 30, 2004

(30) Foreign Application Priority Data

Sep. 17, 2001 (DE) ................................ 101 45 847

(51) Int. Cl.
*B25B 23/04* (2006.01)
(52) U.S. Cl. ...................... 81/429; 81/54; 81/55; 81/56
(58) Field of Classification Search .................. 81/54, 81/55, 56, 429
See application file for complete search history.

(56) References Cited

U.S. PATENT DOCUMENTS 4,047,456 A    9/1977   Scholz (Continued)

FOREIGN PATENT DOCUMENTS

DE    196 38 901    3/1998

(Continued)

OTHER PUBLICATIONS

English language translation of EP 0 830 919 which corresponds to DE 196 38 901.

(Continued)

*Primary Examiner*—Joseph J. Hail, III
*Assistant Examiner*—Shantese McDonald
(74) *Attorney, Agent, or Firm*—Ostrolenk, Faber, Gerb & Soffen, LLP

(57) ABSTRACT

A hydraulic threaded bolt tightening device (1) for tightening and loosening large bolted connections, comprising a cylinder supported on a machine part to be clamped by means of a threaded bolt and a nut (2), at least one piston which is guided thereon in a sealed manner, with a threaded bush screwed on to one end of the threaded bolt and which can be pressurized, a pressure medium supply (4) to the threaded bolt tightening device (1), an adjusting ring (6) arranged in the cylinder and connected to the nut (2) by a form fit, and a rotary drive (7) for the adjusting ring (6) with a drive connection (16) to the adjusting ring (6), a rotation angle sensor (8) on the rotary drive, a control device (9) for driving the pressure medium supply (4) to the threaded bolt tightening device (1) and the rotation of the rotary drive (7), an input device (1), and the rotation of the rotary drive (7), an input device (10) for entering the pitch of the threaded bolt, and a computer device (11) for converting the rotation angle of the nut, measured by means of the rotation angle sensor (8), into the extension of the threaded bolt effected by the threaded bolt tightening device (1).

16 Claims, 1 Drawing Sheet

U.S. PATENT DOCUMENTS 5,257,207 A * 10/1993 Warren ........................ 702/43
5,343,785 A *  9/1994 Holt et al. ................. 81/57.38

FOREIGN PATENT DOCUMENTS

EP          0 223 713      5/1987

OTHER PUBLICATIONS

English language equivalent U.S. 4,829,650 which corresponds to EP 0 223 713.

International Search Report.

* cited by examiner

HYDRAULIC THREADED BOLT TIGHTENING DEVICE AND METHOD OF USE THEREOF

BACKGROUND OF THE INVENTION

The invention relates to a hydraulic threaded bolt tightening device for tightening and loosening large bolts and to a method for tightening such bolts by means of the threaded bolt tightening device. The device comprises a cylinder supported on a machine part to be tightened by means of a threaded bolt and a nut. At least one piston is guided in the cylinder in a sealed manner. The cylinder is supported on a threaded bush screwed on to one end of the threaded bolt. The cylinder can be pressurized periodically. There are a pressure medium supply to the threaded bolt tightening device and a pressure medium connection on the threaded bolt tightening device. An adjusting ring is arranged in the cylinder and is connected to the nut by a form fit. A rotary drive for the adjusting ring has a drive connection to the adjusting ring.

A hydraulic threaded bolt tightening device of this type is described in DE 28 46 668 A1. In detail, the device comprises an extension measuring device having a measuring rod arranged within a central bore in the bolt to be measured. The extension measuring device has a housing and a sensing pin which can be displaced relative to the housing and is connected with housing and sensing pin between reference surfaces of the bolt, on the one hand, and the measuring rod, on the other hand. The relative displacement of the bolt reference surface in relation to the measuring rod reference surface provides a measure of the axial extension of the shank of the bolt. The sensing pin is a constituent part of a measuring sensor designed as an inductive transducer. The supply and measuring lines connected to the measuring sensor are led to a control cabinet which is arranged at a distance from the pressure container and is used for power supply and measured value processing. It is possible for a displacement tube, which is used to guide out the measuring rod reference surface and to connect the measuring sensor housings to be brought into engagement with the measuring rod by a quick-action coupling.

Although this known device enables remotely controlled tightening and loosening of bolted connections, the monitoring of the tightening and loosening is carried out purely based on a length measurement, which requires a measuring rod arranged within a central bore in the bolt to be measured. This necessitates increased expenditure in the production of the bolt and requires an additional extension measuring device in conjunction with the bolt tightening device.

The device described in DE 32 46 840 C2 for the automatic control of a plurality of stud tightening devices permits the tightening of numerous stud tightening devices simultaneously under the control of a central control unit, which supplies the signals designating the individual operations. When a specific operation has been completed, each tightening device supplies an output signal, which is picked up by the control unit, which then generates the signals designating the next operation. The control unit contains a follower processing unit for generating a common command signal for the various tightening devices, so that the latter can be driven simultaneously, and also a number of adjusters, which in each case pick up the command signal from the follower processor unit and transmit it only to the relevant associated tightening device. The triggering time of the adjuster corresponds to the time of the completion of the operation of the associated tightening device; it is independent of the other tightening devices and the follower processor unit. If one of the tightening devices does not operate, it does not supply any output signal. The other tightening devices are then deactivated and the device that does not operate unless it is either actuated or started up by hand. No statements relating to measuring the bolt extension can be gathered from DE 32 46 840 C2.

EP 0 928 660 A1 describes a threaded bolt tightening device for tightening and loosening bolts by heating the bolt by means of a bolt heating device inserted into a central bore in the bolt. It comprises a nut rotating device for rotating a nut screwed onto the bolt. An extension indicator measures the thermal extension of the bolt. A control unit controls the drive of the nut rotating device. There is also a power supply to the bolt heating device. The control unit comprises at least one device for actuating the nut rotating device for tightening and loosening the nut and also for interrupting the power supply to the bolt heating device when the measured value from the extension indicator reaches a predefined extension. When the nut is tightened, yet another device exerts a torque on the nut, stops the nut rotating device and interrupts the power supply to the bolt heating device when the nut has been rotated by a predefined angle. When the nut is to be loosened, a device rotates the nut with a predefined number of rotations if the nut is loosened such that it can be rotated, and then both stops the nut rotating device and interrupts the power supply to the bolt heating device.

U.S. Pat. No. 5,257,207 A describes a hydraulic threaded bolt tightening device for tightening and loosening bolts, in which a distance measurement between the flanges to be clamped is carried out. The distance measurement is carried out continuously with reference to the applied prestressing force. From this, the slope of the distance-prestressing force curve is determined in a control device, in order, by using a point of inflection that occurs when the settling point is reached, to determine whether full compression of a seal has been reached. This is followed only by elastic deformation, in particular extension of the bolt up to a predefined prestress. The feed rotation of the nut is carried out by hand without rotation angle measurement. In addition to the distance measurement to be carried out continuously, it is also necessary for the applied prestressing force to be measured continually via the pressure in the hydraulic threaded bolt tightening device.

SUMMARY OF THE INVENTION

The invention is based on the problem of developing the known hydraulic threaded bolt tightening devices in such a way that automated actuation without previous computational effort is possible, a simple measurement of the bolt extension by devices present on the hydraulic threaded bolt tightening device is made possible, and to accelerate the tightening operation of the respective threaded bolt.

Starting from this problem, a hydraulic threaded bolt tightening device is disclosed which comprises a cylinder supported on a machine part to be tightened by means of a threaded bolt and a nut, at least one piston which is guided thereon in a sealed manner, is supported on a threaded bush screwed on to one end of the threaded bolt and can be pressurized periodically, a pressure medium supply to the threaded bolt tightening device, a pressure medium connection on the threaded bolt tightening device, an adjusting ring arranged in the cylinder and connected to the nut by a form fit, and a rotary drive for the adjusting ring with a drive connection to the adjusting ring, whose torque can be set such that it tightens the nut as far as the play-free settling of all the components to be clamped by the threaded bolt and then stops, a rotation angle sensor on the rotary drive which, when the play-free settling (stoppage of the rotary drive) is reached, can be set to zero, a control device for driving the pressure medium supply to the threaded bolt tightening device and the simultaneous rotation of the rotary drive, an input device for entering the thread pitch of the threaded bolt and the intended rotation or intended prestressing force, a computer device for converting the nut rotation angle, measured by means of the rotation angle sensor, into the extension of the threaded bolt effected by the threaded bolt tightening device, and a shut-off device for the pressure medium supply, which interrupts the pressurization when a rotation angle of the amount corresponding to a predefined intended extension or intended prestressing force is reached.

The hydraulically, pneumatically or electrically driven rotary drive permits acceleration of the feed rotation of the nut as far as the play-free settling of all the components to be clamped by the threaded bolt. The rotation angle sensor supplies measured values to the computer device, which uses the thread pitch of the threaded bolt to calculate the extension of the threaded bolt effected by the threaded bolt tightening device directly from the rotation angle of the nut, so that a dial gage for measuring the piston travel of the threaded bolt tightening device is superfluous.

By means of an indicating device, the extension of the threaded bolt resulting from the measured rotation angle of the nut can be indicated directly.

If, in addition, an input device is provided for the diameter or the cross section of the threaded bolt, the computer device can be configured in such a way that the rotation angle of the nut, measured by means of the rotation angle sensor, can be converted into the prestressing force of the threaded bolt effected by the threaded bolt tightening device, which force may be indicated in the indicating device.

If the intended extension or the intended prestressing force of the threaded bolt is entered into the computer device by means of an input device, the pressurization of the threaded bolt tightening device can be interrupted automatically by means of a switch-off device when the intended extension or the intended prestressing force of the threaded bolt is reached.

The rotary drive used can preferably be a geared electric motor, which may be constructed particularly advantageously as an electric stepping motor which forms the rotation angle sensor at the same time.

This rotary drive may be constructed in such a way that its torque can be adjusted such that it tightens the nut as far as the play-free settling of all the components to be clamped by the threaded bolt and, in the process, applies a prestress to the threaded bolt in such a way that no settling losses arise. If, then, the hydraulic threaded bolt tightening device is actuated and stretches the threaded bolt, the nut lifts off the components to be clamped and the rotary drive can continue to rotate the nut until the set intended extension of the threaded bolt is reached, at which point the pressure medium supply to the hydraulic threaded bolt tightening to be clamped by the threaded bolt, after which the rotary drive rotates the nut until it makes contact with the components to be clamped by the threaded bolt. In this case, the threaded bolt tightening device performs the task of pretightening all the components to be clamped by the threaded bolt as far as play-free settling, before the actual tightening operation and the feed rotation of the nut are carried out.

With the hydraulic threaded bolt tightening device according to the invention, a method for tightening large bolts can be carried out which comprises the following steps:

Entering the thread pitch of the threaded bolt into the input device, entering the intended extension of the threaded bolt into the input device, switching on the rotary drive in order to feed rotate the nut until the rotary drive stops, setting the rotation angle sensor to zero, switching on the pressurization of the threaded bolt tightening device, continuing to rotate the nut by means of the rotary drive and switching off the pressurization when the intended extension of the threaded bolt is reached.

If, instead of the intended rotation, the intended prestress of the threaded bolt is predefined, the method may be carried out in such a way that the threaded bolt diameter or cross section may additionally be entered into the input device. The computer device then uses the thread pitch, the threaded bolt diameter or cross section and the rotation angle of the nut to calculate the actual prestress and switches off the pressurization of the threaded bolt tightening device when the intended prestress is reached.

These method variants can comprise the additional step, following the input, of initially pressurizing the threaded bolt tightening device with the pressure which corresponds to about 5% of the maximum pressure, in order to achieve play-free settling of all the components to be clamped by the threaded bolt, after which the further steps, namely switching on, setting to zero, switching on, continuing to rotate, switching off, are carried out.

With the threaded bolt tightening device according to the invention and the associated method, the tightening of threaded bolts can be carried out automatically and requires only the entry of the thread pitch of the threaded bolt and, if appropriate, the threaded bolt diameter or cross section and the entry of the intended extension or intended prestress of the threaded bolt into the input devices. After the threaded bolt tightening device has been switched on, the tightening operation proceeds completely automatically.

BRIEF DESCRIPTION OF THE DRAWINGS

The invention will be explained in more detail below using an exemplary embodiment illustrated in the drawing.

A hydraulic thread bolt tightening device 1 is illustrated schematically in FIG. 1. With regard to the functioning and the internal construction of the threaded bolt tightening device 1, reference is made to DE 196 38 901 A1 from the same applicant.

Figure 1:
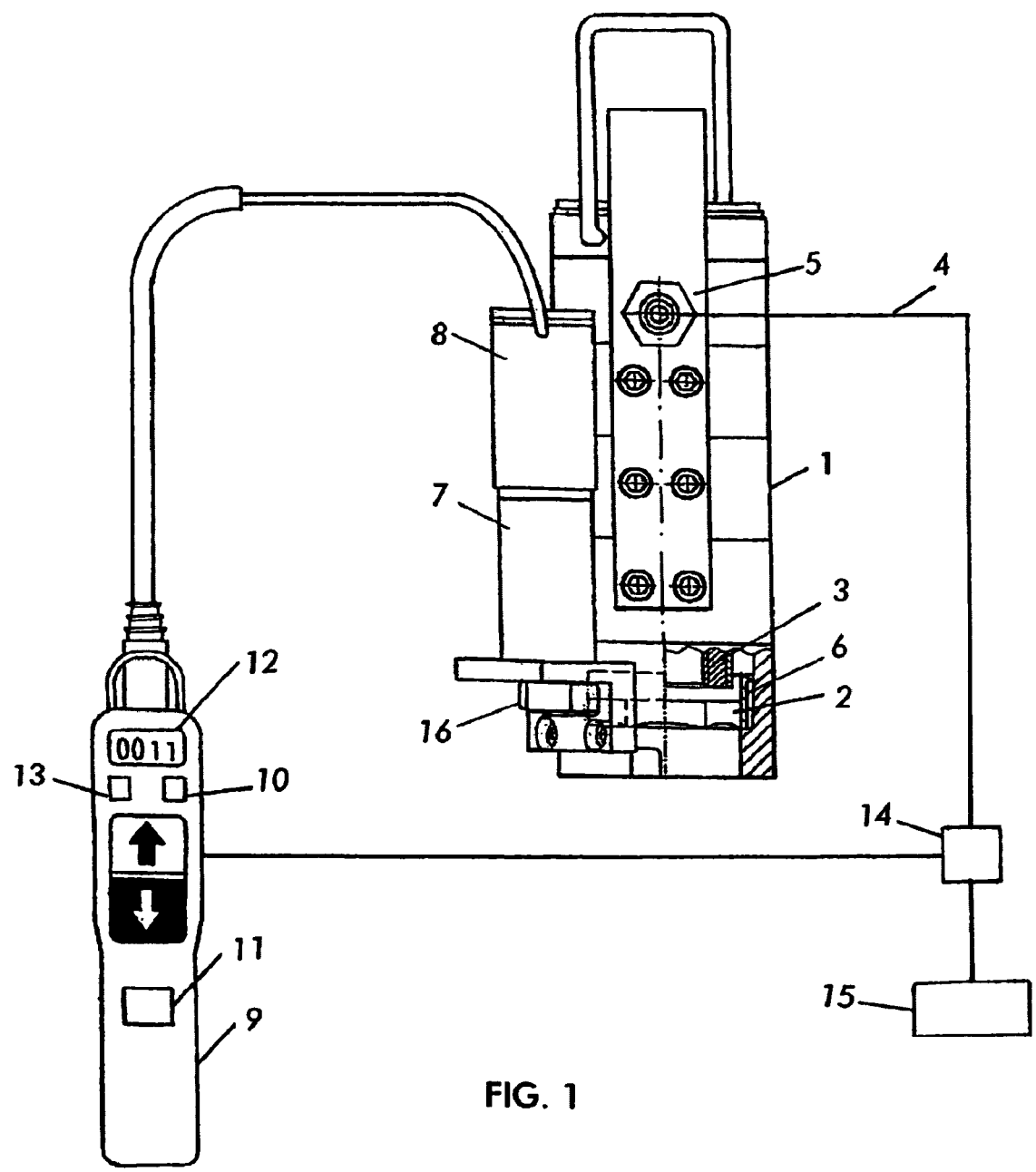

In order to tighten a threaded bolt, not illustrated, the threaded bolt tightening device is placed over a nut 2, which is screwed onto the threaded bolt, an adjusting ring 6 provided with an internal hexagon engaging over the nut 2 with a form fit. A threaded bush 3, which is connected to a tightening piston in the threaded bolt tightening device 1, is screwed onto the projecting end of the threaded bolt, after which the threaded bolt tightening device 1 is ready for use. A hydraulic pressure generator 15 is connected to the threaded bolt tightening device via a shut-off device 14, a pressure medium supply 4 and a pressure medium connection 5.

The adjusting ring 6 is provided with external toothing, in which a gear wheel 16 on a rotary drive 7 constructed as a geared electric motor engages. Connected to the rotary drive 7 is a rotation angle sensor 8, which picks up the rotation angle of the rotary drive 7 and therefore, via the drive connection 16 to the adjusting ring 6, the rotation angle of the nut 2.

If the rotary drive 7 is constructed as an electric stepping motor, it constitutes the rotation angle sensor 8 at the same time.

A control device 9 is connected to the rotary drive 7 and the shut-off device 14. The control device 9 has an input device 10 for the thread pitch and an input device 13 for the intended extension of the threaded bolt.

The input device 10 for the thread pitch can additionally have a possible input for the threaded bolt diameter or cross section. In this case, the intended prestressing force of the threaded bolt is entered into the input device 13.

There is also a computer device 11 which, for example, can be integrated into the control device and uses the thread pitch entered and the rotation angle of the nut 2 to calculate the extension of the threaded bolt when the threaded bolt tightening device 1 is actuated, and indicate said extension in an indicator device 12.

If, in addition to the thread pitch, the threaded bolt diameter or cross section is also entered into the input device 10, the computer device 11 can calculate the actual prestressing force of the threaded bolt from this and from the rotation angle of the nut 2 and indicate said prestressing force in the indicating device 12.

In order to tighten a threaded bolt, the threaded bolt tightening device 1 is placed in the manner described above on a bolt provided with a nut 2, and the thread pitch and the intended extension are entered into the input device 10, 13.

By means of first actuation of the rotary drive 7, the nut 2 is tightened to such an extent that play-free settling of all the elements to be clamped by the threaded bolt is achieved. Since the torque applied by the rotary drive 7 is only sufficiently high for the play-free settling to be achieved, the rotary drive 7 comes to a standstill and applies to the threaded bolt only the prestress which is necessary for the play-free settling of all the components to be clamped by the threaded bolt. In this position, the rotation angle sensor 8 is set to zero and the shut-off device 14, which is constructed as an electrically driven servo valve, is opened by means of the control device 9, so that the hydraulic pressure generated by the hydraulic pressure generator 15 is propagated into the threaded bolt tightening device 1 via the pressure medium supply 4 and the pressure medium connection 5 and has the effect of extending the threaded bolt. The rotary drive 7 always continues to rotate the nut 2 by means of the thread bolt tightening device 1 during the extension of the threaded bolt to such an extent that it remains in contact with the components to be clamped by the threaded bolt. The rotation of the nut 2 is thus directly proportional to the extension and the prestress of the threaded bolt. The rotation of the nut 2 is picked up by the rotation angle sensor 8, passed to the control device 9, which effects automatic interruption of the pressurization of the threaded bolt tightening device 1 by closing the shut-off device 14 when the entered intended extension or the intended prestress of the threaded bolt is reached.

The tightening operation is therefore completed, and the pressure on the threaded bolt tightening device is relieved, the latter then being loosened from the tightened threaded bolt and being capable of placement on a further threaded bolt to be tightened.

Instead of effecting the play-free setting of all the components to be clamped by the threaded bolt by means of the feed rotation of the nut by means of the rotary drive, this can also be achieved by means of the threaded bolt tightening device if the latter is initially pressurized with about 5% of the maximum pressure, the nut is feed rotated and only then is the actual tightening operation carried out.

What is claimed is:

1. A hydraulic, threaded bolt tightening device for tightening and loosening bolts, comprising
   a cylinder supported on a machine part, wherein the cylinder is to be clamped by a threaded bolt and a nut tightened onto the bolt,
   a threaded bush screwed on to one end of the threaded bolt;
   at least one piston which is guided to move in the cylinder in a sealed manner, and the piston can be pressurized periodically, the piston is supported on the bush;
   a pressure medium supply to the threaded bolt tightening device,
   a pressure medium connection from the supply located on the threaded bolt tightening device,
   an adjusting ring arranged in the cylinder and connected to the nut by a form fit for rotating the nut,
   a rotary drive for rotating the adjusting ring with a drive connection to the adjusting ring,
   a rotation angle sensor on the rotary drive for sensing the rotation angle of the rotary drive and thereby of the nut,
   a control device for driving the pressure medium supply to the threaded bolt tightening device and for causing the rotation of the rotary drive,
   an input device for entering the pitch of the threaded bolt, and
   a computer device connected with the rotation angle sensor for converting the rotation angle of the nut, as measured by means of the rotation angle sensor, into the extension of the threaded bolt effected by the threaded bolt tightening device.

2. The hydraulic threaded bolt tightening device as claimed in claim 1, further comprising an indicating device for the extension of the threaded bolt resulting from the measured rotation angle of the nut.

3. The hydraulic threaded bolt tightening device as claimed in claim 1, further comprising a further input device for entering the diameter or cross section of the threaded bolt, and the computer device being operable for converting the rotation angle of the nut, as measured by means of the rotation angle sensor, into the prestressing force of the threaded bolt effected by the threaded bolt tightening device.

4. The hydraulic threaded bolt tightening device as claimed in claim 3, further comprising an indicating device connected with the computer device and operable for indicating the prestressing force of the threaded bolt resulting from the measured rotational angle of the nut.

5. The hydraulic threaded bolt tightening device as claimed in claim 1, wherein the rotary drive comprises a geared electric motor.

6. The hydraulic threaded bolt tightening device as claimed in claim 5, wherein the rotary drive comprises an electric stepping motor and the rotation angle sensor comprises the electric stepping motor.

7. The hydraulic threaded bolt tightening device as claimed in claim 5, further comprising a shut-off device is between the pressure supply and the threaded bolt tightening device and the shut off device driven such that the threaded bolt tightening device is initially pressurized with about 5% of the maximum pressure for obtaining play-free settling of all components to be clamped by the threaded bolt, and the rotary drive is operable thereafter to rotate the nut until the nut contacts components to be clamped by the threaded bolt and then the nut stops.

8. The hydraulic, threaded bolt tightening device as claimed in claim 1, wherein the adjusting ring is form fitted on the nut.

9. The hydraulic, threaded bolt tightening device as claimed in claim 1, further comprising an input device for entering an intended extension or an intended prestressing force of the threaded bolt, and
a shut-off device for the pressurization of the threaded bolt tightening device, which interrupts the pressurization when the intended extension or the intended prestressing force of the threaded bolt is reached.

10. The hydraulic, threaded bolt tightening device as claimed in claim 1, wherein the rotary drive produces torque which can be set such that it tightens the nut until play-free settling of all components to be clamped by the threaded bolt.

11. A method for tightening bolts using a hydraulic, threaded bolt tightening device, the method comprising the steps of:
entering a thread pitch of a threaded bolt into an input device
entering an intended extension of the threaded bolt which is dependent upon the thread pitch of the bolt and a rotation angle of a nut rotated onto the bolt into the input device,
switching on a rotary drive in order to feed rotate a nut onto the bolt until the rotary drive stops,
setting a rotation angle sensor, which is connected to the rotary drive to zero,
switching on pressurization of the threaded bolt tightening device,
then continuing to rotate the nut by the rotary drive and
switching off the pressurization of the tightening device when the intended extension of the threaded bolt is reached.

12. The method as claimed in claim 11, having the additional step following the entering steps:
switching on the threaded bolt tightening device and pressurizing with about 5% of the maximum pressure, in order to achieve play-free settling of all components to be clamped by the threaded bolt.

13. The method of claim 11, further comprising computing intended extension of the bolt from the thread pitch and the sensed rotation angle.

14. A method for tightening large bolts by means of a hydraulic, threaded bolt tightening device, the method comprising the steps of:
entering a thread pitch of a threaded bolt into an input device,
entering a threaded bolt diameter or cross section into the input device,
entering an intended prestress of the threaded bolt into the input device,
switching on a rotary drive in order to feed rotate a nut onto the bolt until the rotary drive stops at an intended prestress,
setting a rotation angle sensor, which is connected to the rotary drive to zero,
switching on pressurization of the threaded bolt tightening device,
then continuing to rotate the nut by the rotary drive and
switching off the pressurization when the intended prestress of the threaded bolt is reached.

15. The method of claim 14, having the additional step following the entering steps:
switching on the threaded bolt tightening device and pressurizing with about 5% of the maximum pressure, in order to achieve play-free settling of all components to be clamped by the threaded bolt.

16. The method of claim 14, further comprising computing the intended prestress of the threaded bolt from the thread pitch, the bolt diameter or the bolt cross section, the setting of the rotation angle and the entered prestress of the bolt.

* * * * *